United States Patent [19]
Seifert

[11] Patent Number: 5,716,105
[45] Date of Patent: Feb. 10, 1998

[54] METHOD AND APPARATUS FOR FACILITATING AUTOMOTIVE SPARE WHEEL REPLACEMENT

[76] Inventor: Thomas G. Seifert, 2533 NW. 56th St., Oklahoma City, Okla. 73112-7140

[21] Appl. No.: 774,959

[22] Filed: Dec. 27, 1996

Related U.S. Application Data

[63] Continuation-in-part of Ser. No. 723,676, Sep. 30, 1996.

[51] Int. Cl.⁶ .................................................. B25B 27/14
[52] U.S. Cl. .................................... 301/35.62; 29/273
[58] Field of Search ................ 301/5.1, 6.1, 35.62, 301/38.1, 40.2, 111; 29/271, 273

[56] References Cited

U.S. PATENT DOCUMENTS

| | | | |
|---|---|---|---|
| 1,384,405 | 7/1921 | Putnam | 29/273 X |
| 1,494,269 | 5/1924 | Meyers | 29/273 |
| 1,735,124 | 11/1929 | Miller | 29/273 |
| 1,738,682 | 12/1929 | Baker . | |
| 1,775,008 | 9/1930 | Waters . | |
| 1,815,821 | 7/1931 | Baker | 29/273 |
| 2,317,311 | 4/1943 | Stough | 301/9 |
| 2,640,729 | 6/1953 | Niven | 301/9 |
| 3,960,047 | 6/1976 | Liffick | 301/111 |
| 3,973,283 | 8/1976 | Boe | 7/1 E |
| 4,097,979 | 7/1978 | Interdonato | 29/273 |
| 4,602,415 | 7/1986 | Garcia | 29/273 |
| 4,847,971 | 7/1989 | Gevas | 301/35.62 X |
| 4,949,448 | 8/1990 | Hebnes | 29/273 |
| 5,022,133 | 6/1991 | Weitekamp | 29/273 |
| 5,479,692 | 1/1996 | Barkus | 29/468 |

FOREIGN PATENT DOCUMENTS

| | | | |
|---|---|---|---|
| 1261522 | 4/1961 | France | 301/35.62 |

*Primary Examiner*—Russell D. Stormer
*Attorney, Agent, or Firm*—Dougherty & Hessin, P. C.

[57] ABSTRACT

An improved method for changing automotive tires wherein a single lug bolt on each wheel is extended about ⅛ inch longer than all remaining lug bolts so that, when the extended lug bolt is aligned topmost on the wheel, the replacement wheel need only to be hung on the extended lug bolt so that all other wheel holes will hang in alignment with their respective lug bolts for subsequent securing.

13 Claims, 2 Drawing Sheets

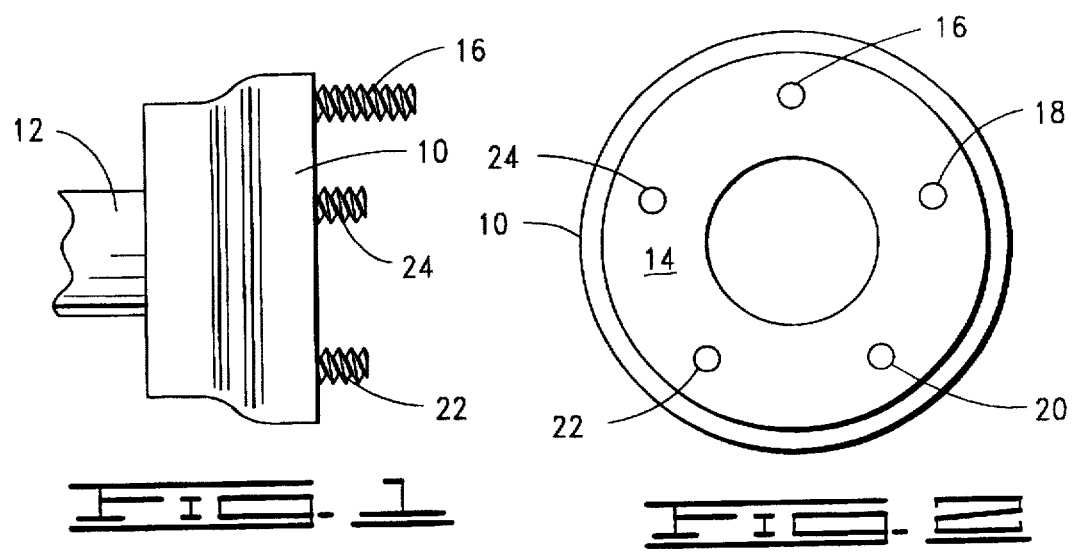
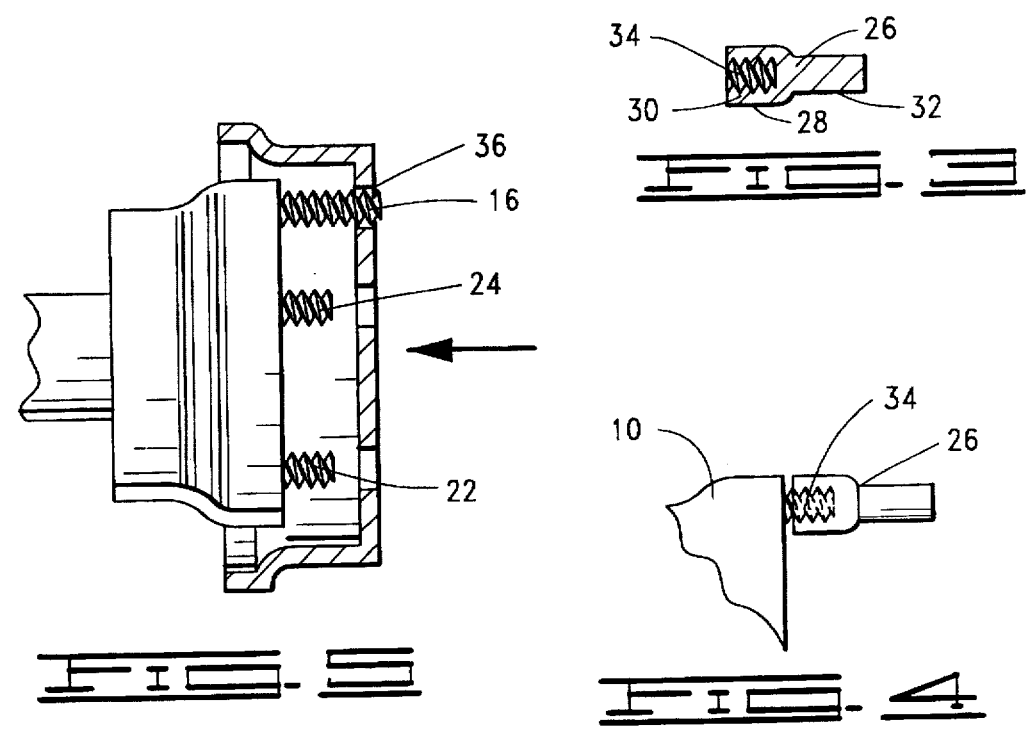

METHOD AND APPARATUS FOR FACILITATING AUTOMOTIVE SPARE WHEEL REPLACEMENT

CROSS-REFERENCE TO RELATED APPLICATION

The present invention is a continuation-in-part of the subject matter of U.S. patent application Ser. No. 08/723,676 as filed on Sep. 30, 1996 and entitled "METHOD OF TIRE MOUNTING".

BACKGROUND OF THE INVENTION

1. Field of the Invention

The invention relates generally to a method of mounting automobile tires and, more particularly, but not by way of limitation, it relates to an improved lug bolt configuration that enables tire/wheel changes with reduced effort and attendant problems.

2. Description of the Prior Art

The prior art as we know it consists of the long-used five lug bolt wheel face plate of the type which has been used for a very long time with little or no change in the basic design. The design of the present invention comes about due to the need for easier alignment of the wheel holes and lug bolts of modern wheels and tires which are now of considerable weight for one man to lift, align and push onto the lug bolts during a tire change.

SUMMARY OF THE INVENTION

The present invention relates to an improved wheel face plate structure wherein a single lug bolt is made ¼ to ⅜ inch longer than the remaining lug bolts so that a replacement wheel can be positioned at the uppermost lug bolt location to enable hanging placement of the replacement tire/wheel so that the hanging wheel may simply be pushed onto the plurality of lug bolts as gravity maintains the lug bolt, wheel hole alignment.

Therefore, it is an object of the present invention to provide a wheel face plate having a lug bolt array that makes it easier for a replacement wheel to be aligned and pushed onto the multiple lug bolt configuration.

It is also an object of the present invention to provide a method of auto wheel/tire replacement that is easier to align while requiring relatively less lifting strength.

Other objects and advantages of the invention will be evident from the following detailed description when read in conjunction with the accompanying drawings that illustrate the invention.

BRIEF DESCRIPTION OF THE DRAWINGS

FIG. 1 is a front view in elevation of an automotive wheel assembly;

FIG. 2 is a side view in elevation of the wheel assembly of FIG. 1;

FIG. 3 is an alternative form of cap screw extension for extending a single lug;

FIG. 4 is a partial view of wheel assembly and lug bolt utilizing a bolt extension of FIG. 3;

FIG. 6 is a front view in elevation illustrating the positioning of a replacement wheel using a guide tube.

DETAILED DESCRIPTION OF THE INVENTION

Figure 5:
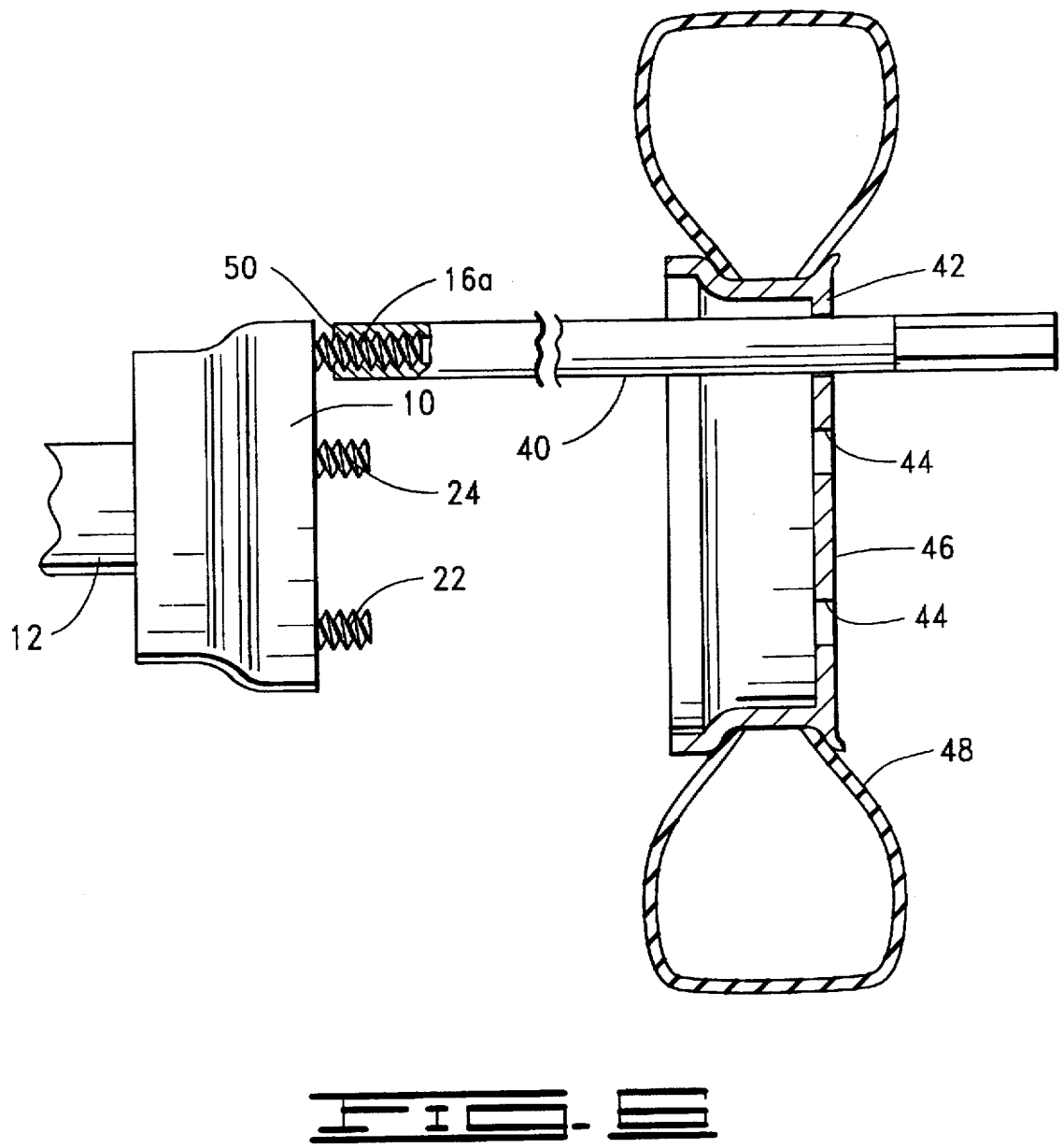
FIG. 5 is a front view in elevation illustrating the manner in which a wheel hub is hung on a wheel assembly lug bolt for seated disposition and placement of lug nuts.

Referring to FIG. 1, a typical automotive wheel hub 10 as supported by axle 12 is illustrated. FIG. 2 shows a side view of the wheel hub 10 viewing the face plate 14 having studs or lug nuts 16, 18, 20, 22 and 24 mounted thereon in circumferentially spaced relationship. One of the lug nuts 16–24 is made to extend about ¼ to ⅜ inch further from face plate 14 when fully inserted into its seated position. In this case, the lug nut 16, aligned at the topmost position of wheel hub 10, is the position with the extended lug bolt 16. The purpose is to aid when changing tires, as will be further described below.

FIGS. 3 and 4 illustrate an alternative form of the invention which enables the same method for facilitating replacement of wheels/tires when required. FIG. 3 illustrates a cap screw extension 26 having a cap portion 28 with a threaded axial bore 30 having threads to match those of the standard automobile lug bolt. The cap portion 28 is then formed with an axial extension 32 which functions to lengthen the lug bolt by ¼ to ⅜ inch to serve as a wheel hanger during tire changing exercises. FIG. 4 shows the operative function when the cap screw extension 26 is threadedly received over the end of a lug bolt 34 of wheel hub 10. During the tire changing exercise, the particular lug bolt 34 receiving the cap screw extension 26 would be rotated to the topmost position around the circumfery of wheel hub 10 thereby to receive the spare tire in hanging suspension subject to be further slid onto the complete five lug bolt positions for subsequent securing by assembled lug nuts (not shown). The extension 26 may be removed to place the remaining lug nut onto the lug bolt 34 to secure the wheel.

FIG. 5 illustrates the operational aspects of the invention. Thus, during a tire changing sequence, it is only necessary to rotate the long lug bolt 16 to the topmost position of wheel drum 10 after jacking up the vehicle. In the case of front wheels, the wheel hub 10 can be readily rotated to place the extension lug bolt 16 topmost; however, for the rear wheels, the car must be securely blocked both front and back with the shift placed in neutral to thereafter rotate the long stud into the top position and then returning the shift to the "park" setting. In any event, once the extension lug bolt 16 has been placed in the top position, the spare tire can be installed by placing a wheel hub hole 36 on the extension nub portion of the extended lug nut 16 so that the replacement wheel hub 36 hangs down and gravity causes alignment of the remaining wheel holes with their respective lug bolts 18, 20, 22 and 24. Thereafter, the tire changer need only push laterally against the replacement tire and/or wheel to position all wheel holes on respective lug bolts for subsequent threaded placement of lug nuts to lock the replacement wheel in place for operation.

The standard or common brake drum extensions of the axles of an automobile have four, or usually, five threaded studs or lug bolts which protrude in parallel from the face plate 14 of wheel drum 10. It is quite often difficult for a person of normal strength to hold a replacement tire and wheel up from the ground while simultaneously aligning the five wheel holes with the five lug bolts. Utilizing the extended lug nut 16, centered topmost during the changing sequence, the replacement tire/wheel may be positioned to enable one to slide all wheel holes onto the respective lug bolts 16–24.

FIG. 6 illustrates still another alternative wheel changing aid that utilizes a guide tube 40 in combination with a selected one of the standard lug bolts 16a. The guide tube 40 may be such as a length of standard hard drawn copper tube of ⅝ inch outside diameter having ½ inch inside diameter. Such a tube freely fits over any modern day automotive wheel stud which may be ½ inch nominal, i.e., 7/16 inch or 12 mm (0.47244 inch or 31/64 inch) in certain foreign cars. The guide tube 40 operates in conjunction with one dedicated wheel hub hole 42 which aligns as the topmost hole during a wheel change while remaining conventional wheel holes 44 function in their usual manner. Thus, with one hole 42 reamed out or enlarged a minuscule amount to ⅝ inch so that it freely accepts the guide tube 40, and the remaining multiple of lug holes 44 existing at their same size and taper, the attached and bolted wheel 46 and tire 48 are securely mounted and the fit of the hole/nut/stud relationship is not compromised to any degree.

For vans, busses, trucks, tractors and other heavier equipment that employs heavy tires and a multiplicity of studs, it may be necessary to ream the dedicated hole 42 to a size which will accommodate a much larger and stronger guide tube 40. By the nature of steel wheel rims, the metal in contact with the holding nut placed on the stud in the enlarged hole is under compression when tightened and has immense strength thus, unless all of the nut contact area has been removed, the form, fit and function has not been diminished. If there is no contact area, the function can be restored by the manufacturer by redesigning the nut to provide a washer type filler-spacer to restore the holding qualities of the original stud nut.

In operation, it is only necessary to jack up the vehicle far enough for the tires to clear the ground surface, and then to rotate the wheel hub until a selected stud 16a (for example) is in the topmost position. The replacement wheel 46 and tire 48 may then be maneuvered into mounting position with the enlarged hole 42 at the topmost position. The guide tube 40 is then inserted through the enlarged hole 42 to place the tube end 50 over the dedicated stud 16a whereupon the wheel 46 can be slided manually along guide tube 40 and onto stud 16a and remaining studs 26, 22, etc. If necessary, the changer can place one foot against the bottom of the tire while simultaneously lifting up the guide tube 40 to horizontal while pushing the tire onto the hub with his foot as the free hand slides the tire into place onto the pre-aligned protruding studs. Wheel bolts may be started on all remaining studs except the topmost hanger stud 16a, whereupon the slide guide 40 may be removed with subsequent tightening of all nuts alternately and in rotation to the desired degree of security.

The foregoing discloses a method utilizing a simple lug bolt extension for greatly facilitating the changing of spare tires during emergency situations. In addition to being a customer pleasing innovation, the bolt extension would cause little or no cost increase to the car manufacturer.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A method for facilitating automotive spare wheel replacement, comprising:
   providing an extended-length lug bolt at a single lug bolt position on the face plate of a wheel assembly;
   placing the replacement wheel in suspension with a topmost wheel lug hole hanging from said extended-length lug bolt such that all remaining wheel lug holes and lug bolts are in alignment; and
   pushing the wheel laterally to engage all lug bolts in respective wheel lug holes to receive respective lug nuts thereby to secure said replacement wheel.

2. An automotive wheel assembly, comprising:
   a wheel hub assembly having a faceplate; and
   a plurality of lug bolts disposed in circumferential spacing around said faceplate, wherein a single one of said lug bolts is longer than all others of said lug bolts which are of substantially uniform length, whereby a replacement wheel having a plurality of lug bolt holes therein may be placed adjacent to said wheel hub assembly and said one lug bolt disposed through one of the holes in the replacement wheel such that the wheel may be hung from said one lug bolt and the other of the holes in the wheel substantially aligned with corresponding other lug bolts.

3. A wheel assembly as set forth in claim 2 wherein: said plurality of lug bolts amounts to five lug bolts.

4. A wheel assembly as set forth in claim 2 wherein: said plurality of lug bolts amounts to four lug bolts.

5. A method for facilitating automotive spare wheel replacement, comprising:
   providing a guide tube having an inside diameter sized to fit over a lug bolt;
   providing a replacement wheel with a single enlarged lug bolt hole of diameter sufficient to pass the guide tube therethrough; and
   positioning the guide tube over a lug bolt and through the single enlarged hole in support of the replacement wheel so that the wheel can be urged laterally into engagement with all lug bolts in respective lug bolt holes.

6. A method as set forth in claim 5 wherein the step of providing a replacement wheel comprises:
   reaming a selected lug bolt hole to an enlarged diameter sufficient to receive closely the guide tube for positioning over a selected lug bolt.

7. A method for facilitating wheel replacement on a vehicle, said method comprising the steps of:
   providing an extended length lug bolt at a single lug bolt position extending from a wheel hub of the vehicle adjacent to a plurality of other lug bolts extending from the hub;
   rotating said hub to locate said extended length lug bolt at a topmost position on said hub;
   placing a replacement wheel adjacent to said hub such that said extended length lug bolt extends through a topmost hole defined in said wheel and thereby hanging said wheel from said extended length lug bolt such that the remaining holes defined in said wheel are substantially aligned with the other of said lug bolts; and
   moving the wheel laterally such that the other of said lug bolts are disposed through the respective holes in said wheel.

8. The method of claim 7 further comprising the step of engaging all of said lug bolts with a plurality of respective lug nuts such that said wheel is secured to said hub.

9. A method for facilitating wheel replacement on a vehicle, said method comprising the steps of:
   providing the wheel with an enlarged lug hole;
   providing a guide tube having an inside diameter adapted for sliding engagement with one of a plurality of lug bolts extending from a vehicle hub and an outside diameter adapted for sliding through the enlarged lug hole;

positioning the guide tube through the enlarged lug hole in the replacement wheel and sliding the guide tube over said one of said lug bolts such that the wheel hangs from the guide tube;

pushing the wheel laterally along the guide tube to engage the enlarged hole with the lug bolt over which said guide tube is positioned and to engage the remaining lug bolts in respective holes defined in said wheel; and removing said guide tube.

10. The method of claim 9 wherein said lug bolt engaged by said guide tube is in a topmost position with respect to said wheel hub.

11. The method of claim 9 further comprising engaging said lug bolts with lug nuts to lock said wheel against said hub.

12. A vehicle wheel assembly comprising:

a wheel hub;

a wheel adapted for positioning adjacent to said wheel hub, said wheel defining a plurality of holes therethrough, one of said holes having a diameter larger than the other of said holes;

a plurality of lug bolts extending from said hub and adapted for engagement through said holes in said wheel; and a guide tube adapted for positioning through said one hole, said guide tube having an inside diameter adapted for sliding engagement with one of said lug bolts.

13. The apparatus of claim 12 wherein said guide tube comprises a length of hard drawn copper tubing.

* * * * *